Patented Dec. 24, 1940

2,226,418

UNITED STATES PATENT OFFICE 2,226,418

GLASS COMPOSITION

Edgar D. Tillyer and Harold R. Moulton, Southbridge, and Townsend M. Gunn, Attleboro, Mass., assignors to American Optical Company, Southbridge, Mass., a voluntary association of Massachusetts No Drawing. Application May 15, 1936, Serial No. 79,960. Renewed May 10, 1940

6 Claims. (Cl. 106—36.1)

This invention relates to a new glass composition and to a lens having the properties of said composition.

The principal object of this invention is to obtain a composition of matter that is substantially transparent without absorption in the visible region of the spectrum but which absorbs strongly in the extra visual region, such as the ultra-violet and/or infra-red.

Another object of the invention is to provide a lens having the above characteristics.

Another object is to provide a composition or lens having the properties of desirably modifying the resulting colors produced by metallic oxides, such as cobalt, vanadium, chromium, nickel, uranium, etc.

Another object is to provide a composition having the additional advantage of being fusible at a temperature much below that of ordinary glass, thereby reducing the attack on refractories, saving on fuel, and permitting the incorporating of ingredients adversely affected by extremely high temperatures.

Another object is to obtain a glass of these desirable characteristics which will maintain a practical degree of stability to weathering.

Another object is to provide a carrier or solvent of a relatively colorless brilliant composition having a low melting point in which ingredients having other desirable characteristics may or may not be incorporated.

Other objects and advantages of the invention will become apparent from the following description and it will be seen that many changes may be made in the arrangement of parts and methods described without departing from the spirit of the invention as expressed in the accompanying claims. We therefore do not wish to be limited to the exact details and methods described as the preferred forms only have been set forth by way of illustration.

In the past there have been other glass compositions having similar characteristics as regards the retarding of infra-red and/or ultra-violet, but such glasses possessed an undesirable color and tended to produce an unpleasant cosmetic effect, and to change the color sensations perceived by the eyes. It is, therefore, one of the primary objects of this invention to overcome the above difficulties in lenses of this nature by providing a composition and/or lens having the desired ultra-violet and/or infra-red retarding properties and which will be substantially colorless.

The invention comprises primarily the forming of a normally colorless vitreous composition having a relatively low melting point, comprising phosphoric anhydride, aluminum oxide, and barium oxide, up to 15%, with or without the addition of a small quantity of potassium nitrate. For example, a composition having desirable characteristics can be formed as follows:

|  | Per cent |
|---|---|
| $HPO_3$ | 60 to 80 |
| $Al_2O_3$ | 5 to 20 |
| $BaCO_3$ | 0 to 15 |
| $KNO_3$ | 0 to 1 |

The ingredient $Al_2O_3$ of 5 to 20% may be replaced in whole or in part by a substantially equivalent quantity of a beryllium compound (BeO).

The foregoing composition is in most instances utilized as a carrier for ingredients for absorbing infra-red and/or ultra-violet rays, as well as for other ingredients for altering the color of the finished composition or lens formed therefrom, but may be utilized without said ingredients in instances where a colorless, brilliant, and low melting glass composition is desired.

It is to be understood that a composition or product of said composition may comprise the base composition plus any one or more of the infra-red, ultra-violet, or color ingredients, depending upon the nature and characteristics of the lens desired.

To form a lens having infra-red absorptive properties the following composition is preferably utilized:

|  | Per cent |
|---|---|
| $HPO_3$ | 81 |
| $Al_2O_3$ | 7.5 |
| $BaCO_3$ | 4.5 |
| $Fe_3(PO_4)_2 \cdot 8H_2O$ | 1–10 |

This glass has all of the desirable characteristics of the original composition set forth above plus the added feature of absorbing infra-red radiations.

To form a composition or product thereof having properties for absorbing ultra-violet rays, the base composition plus about ½ to 5 per cent of the weight of the base batch of cerium oxide ($Ce_2O_3$) is used depending upon the amount of ultra-violet absorption desired.

To incorporate in the above composition the properties for absorbing infra-red rays as well as ultra-violet rays, a percentage of one to ten of ferrous phosphate ($Fe_3(PO_4)_2 \cdot 8H_2O$) is used. It will be understood that other iron compounds may be used, such as ferrous ammonium phosphate, ferrous salts decomposable by heat, or all other known compounds which will produce the desired results.

A composition or product thereof comprising the foregoing properties, that is, infra-red and ultra-violet absorption properties, will be substantially colorless when completed. Therefore, to obtain a lens of the desired color, suitable ingredients such as manganese, nickel, uranium, vanadium, cobalt, etc. may be used, depending upon the color desired.

It is to be understood that the invention is not limited to the specific use of the color producing ingredients above mentioned, the said ingredients being set forth only by way of illustration.

It will also be understood that one or more of the above mentioned ingredients may be utilized in the composition and that colors other than blue or green may be formed if desired.

It will also be understood that the percentages set forth in the foregoing formulas are only by way of illustration as to the forming of a usable composition or product of said composition, and that the said percentages may be varied within reasonable limits without materially affecting the composition.

From the foregoing description it will be seen that a novel composition of matter and a novel article possessing infra-red and ultra-violet absorption properties, and being substantially colorless, is formed, and that means is provided by which the color of said composition may be controlled and varied as desired.

Having described our invention, we claim:

1. A vitreous composition resulting from the fusing together of

|  | Per cent |
|---|---|
| $HPO_3$ | 81 |
| $Al_2O_3$ | 7.5 |
| $BaCO_3$ | 4.5 |
| $Fe_3(PO_4)_2.8H_2O$ | 1 to 10 |

2. A vitreous composition resulting from the fusing together of

|  | Per cent |
|---|---|
| $HPO_3$ | 81 |
| $Al_2O_3$ | 7.5 |
| $BaCO_3$ | 4.5 |
| $Fe_3(PO_4)_2.8H_2O$ | 1 to 10 |
| $Ce_2O_3$ _____ weight of the base batch | ½ to 5 |

3. A vitreous composition whose composition will be substantially the same as a composition resulting from the fusing together of:

|  | Per cent |
|---|---|
| $HPO_3$ | 60 to 81 |
| $Al_2O_3$, BeO and mixtures of $Al_2O_3$ and BeO | 1 to 20 |
| $BaCO_3$ | 1 to 15 |
| $Fe_3(PO_4)_2.8H_2O$ | 1 to 10 |

4. A vitreous composition whose composition will be substantially the same as a composition resulting from the fusing together of:

|  | Per cent |
|---|---|
| $HPO_3$ | 60 to 81 |
| $Al_2O_3$, BeO and mixtures of $Al_2O_3$ and BeO | 1 to 20 |
| $BaCO_3$ | 1 to 15 |
| $Fe_3(PO_4)_2.8H_2O$ | 1 to 10 |
| $Ce_2O_3$ _____ weight of the base batch | ½ to 5 |

5. A vitreous composition whose composition will be substantially the same as a composition resulting from the fusing together of:

|  | Per cent |
|---|---|
| $HPO_3$ | 81 |
| $Al_2O_3$, BeO and mixtures of $Al_2O_3$ and BeO | 7.5 |
| $BaCO_3$ | 4.5 |
| $Fe_3(PO_4)_2.8H_2O$ | 1 to 10 |

6. A vitreous composition whose composition will be substantially the same as a composition resulting from the fusing together of:

|  | Per cent |
|---|---|
| $HPO_3$ | 81 |
| $Al_2O_3$, BeO and mixtures of $Al_2O_3$ and BeO | 7.5 |
| $Fe_3(PO_4)_2.8H_2O$ | 1 to 10 |
| $Ce_2O_3$ _____ weight of the base batch | ½ to 5 |

EDGAR D. TILLYER.
HAROLD R. MOULTON.
TOWNSEND M. GUNN.